United States Patent
Ma et al.

(10) Patent No.: US 8,011,775 B2
(45) Date of Patent: Sep. 6, 2011

(54) INK SET, INK SYSTEM AND METHOD FOR PRINTING AN IMAGE

(75) Inventors: Zeying Ma, San Diego, CA (US); Alexey S. Kabalnov, San Diego, CA (US); Shao-Wei Li, San Diego, CA (US); Dennis Z. Guo, San Diego, CA (US); Stephen W. Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 795 days.

(21) Appl. No.: 11/830,926

(22) Filed: Jul. 31, 2007

(65) Prior Publication Data

US 2009/0033728 A1 Feb. 5, 2009

(51) Int. Cl.
*C09D 11/00* (2006.01)

(52) U.S. Cl. .................................. 347/100; 106/31.13

(58) Field of Classification Search .............. 347/100; 106/31.13

See application file for complete search history.

(56) References Cited

U.S. PATENT DOCUMENTS

| 4,614,967 | A | 9/1986 | Sayanagi |
| 4,878,977 | A | 11/1989 | Kueppers |
| 6,069,190 | A | 5/2000 | Bates et al. |
| 6,152,999 | A | 11/2000 | Erdtmann et al. |
| 6,715,869 | B1 | 4/2004 | Reem et al. |
| 7,122,081 | B2 | 10/2006 | He et al. |
| 7,478,903 | B2 * | 1/2009 | Ma et al. .................. 347/100 |
| 2004/0187732 | A1 * | 9/2004 | Roman et al. .............. 106/31.6 |
| 2005/0041082 | A1 * | 2/2005 | Kataoka .................... 347/100 |
| 2005/0284329 | A1 | 12/2005 | Jackson et al. |
| 2006/0075925 | A1 | 4/2006 | Stoffel et al. |
| 2007/0046751 | A1 | 3/2007 | Hamajima |
| 2007/0097193 | A1 | 5/2007 | Ma et al. |

FOREIGN PATENT DOCUMENTS

WO WO 2007060254 A2 * 5/2007

OTHER PUBLICATIONS

U.S. Appl. No. 60/903,921, filed Feb. 28, 2007, Donovan et al.
WO search report dated Feb. 9, 2009.

\* cited by examiner

*Primary Examiner* — Laura E Martin

(57) ABSTRACT

An ink set includes a red ink and a magenta ink. The red ink includes an effective amount of a red pigment having a predetermined red/green lambda cutoff, and the magenta ink includes an effective amount of a magenta pigment having a predetermined red/green lambda cutoff that is substantially similar to the predetermined lambda cutoff of the red pigment.

10 Claims, No Drawings

INK SET, INK SYSTEM AND METHOD FOR PRINTING AN IMAGE

BACKGROUND

The present disclosure relates generally to ink sets, ink systems, and methods of printing an image.

Inkjet printing or recording systems are commonly used as an effective way of producing images on a print medium, such as paper. Generally, ink droplets are ejected from a nozzle at high speed by the inkjet recording system onto the paper to produce an image (e.g., graphics, text, and/or combinations thereof) thereon. It is generally desirable to utilize an inkjet ink that produces both aesthetically pleasing images and long lasting print characteristics. Examples of such print characteristics include print quality (e.g., saturation, chroma, and/or the like) and durability (e.g., water fastness, water resistance, fade resistance, permanence, acid and alkaline high-liter smear resistance, and/or the like). In some instances, one poor characteristic may deleteriously affect other characteristics when inks are deposited on the print medium. For example, inks with low saturation may deleteriously affect color gamut volume.

DETAILED DESCRIPTION

Perceived color quality of inkjet inks may be characterized using any one of several color space systems, such as Munsell or CIELAB. With respect to the Munsell color space, a given color is defined using three terms, namely Hue (H), Value (V), and Chroma (C). With respect to the CIELAB color space, a color is defined using three terms $L^*$, $a^*$, and $b^*$. With the CIELAB system, $L^*$ defines the lightness of a color and ranges from 0 (black) to 100 (white). In addition, the terms $a^*$ and $b^*$ may be used to define the hue and chroma of a color, where $a^*$ ranges from a negative number (green) to a positive number (red) and $b^*$ ranges from a negative number (blue) to a positive number (yellow). The additional terms of $h°$ (hue angle) and $C^*$ (chroma) may also be used to further describe a given color. As such, the Munsell H, V, and C values or the CIELAB $L^*$, $a^*$, and $b^*$ values may be used to calculate a volume of color space that a specific ink set is able to produce, whereby the larger the color space volume the more colors the ink set is capable of producing.

Embodiments of the ink set disclosed herein include red and magenta inks having pigments with the same or similar red/green lambda cutoffs. Without being bound to any theory, it is believed that the ink set advantageously enables enhanced red chroma and saturation and an enlarged color gamut in both the orange red region and the blue region.

"Lambda cutoff", as used herein, is determined by measuring the spectral reflectance of ink when printed on media at an ink density sufficient to achieve maximum chroma, and measuring the wavelength, or lambda, at which the reflectance is the average between minimum reflectance and maximum reflectance. It is believed that the reflectance slope is greatest at this point, and thus the lambda associated with this point is well defined.

The phrases "solid solution pigment" and "pigment solid solution," as used herein, refer to a pigment crystal formed of a homogenous solution in its solid phase.

The phrase "effective amount," as used herein, refers to the minimal amount of a substance and/or agent, which is sufficient to achieve a desired and/or required effect. For example, an effective amount of a "pigment" is the minimum amount required to form an ink having maximum chroma.

One embodiment of the ink set disclosed herein includes a red ink and a magenta ink including pigments with similar red/green lambda cutoffs. In an embodiment, the red and magenta inks each include an effective amount of a pigment having a red/green lambda cutoff ranging from about 585 nm to about 600 nm. Without being bound to any theory, it is believed that using such red and magenta inks enables a maximum chroma red hue angle that substantially matches Adobe RGB and sRGB red hue to be achieved. It is further believed that if the lambda cutoff is less than 585 nm, then the red color is too orange and it becomes difficult to obtain dark red colors. Still further, it is believed that if the lambda cutoff is greater then 600 nm, then it becomes difficult to obtain bright red colors that are similar to Adobe and sRGB.

Non-limiting examples of pigments suitable for the red ink include pigment red 149 (PR149), pigment red 254 (PR254), and pigment red 168 (PR168). It is believed that the characteristics of the pigment selected for the red ink advantageously contribute to images having enhanced red chroma, images having enhanced red saturation, enhanced printing efficiency, enhanced pigment stability, enhanced lightfastness, enhanced ozonefastness, and/or combinations thereof.

A non-limiting example of a pigment suitable for the magenta ink is a quinacridone of formula (A) a mixture of different derivatives of formula (A), or a solid solution of formula (A):

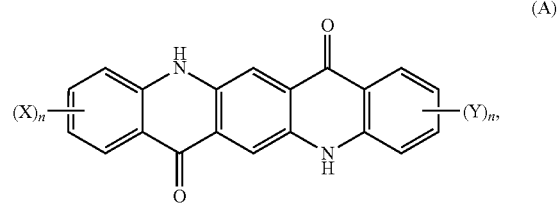

(A)

where X and Y are each independently selected from a halogen, —OH, —$NO_2$, —$CF_3$, a $C_1$-$C_4$ alkyl group, a substituted $C_1$-$C_4$ alkyl group, a $C_1$-$C_4$ alkoxy group, branched alkyl groups, unbranched alkyl groups, a substituted $C_1$-$C_4$ alkoxy group, a phenyl group, a cyclohexyl group, a phenoxy group, —COOH, a —COO—$C_1$-$C_4$ alkyl group, —$SO_3H$, a phenylamino group, a benzamino group, —$N(CH_3)_2$, —$SO_2NH_2$, —$SO_2N(CH_3)_2$, a pyridino group, —$CONH_2$ or —CON$(CH_3)_2$, and wherein n is 0, 1, or 2. A non-limiting example of a suitable magenta pigment is a solid solution of pigment violet 19.

Some embodiments of this pigment also reflect at least about 14% of blue light at a wavelength of about 470 nm when measured at a density which is sufficient for the ink to provide maximum magenta chroma. As such, it is believed that the pigment for the magenta ink substantially enhances blue chroma as well. A specific non-limiting example of a pigment exhibiting both the red/green lambda cutoff and the blue light reflectance suitable for the magenta ink is CROMOPHTAL® Jet Magenta 2BC, which is available from Ciba Specialty Chemicals Inc., Tarrytown, N.Y.

It is further believed that the characteristics of the pigment selected for the magenta ink advantageously provide the ink set with an enhanced color gamut in the orange red region and the blue region, reduced metamerism, enhanced lightfastness, enhanced ozonefastness, and/or combinations thereof.

In embodiments of the ink set disclosed herein, the effective amount of pigment in the respective red and magenta inks ranges from about 3 wt % to about 6 wt %. It is to be understood that the range may vary, depending at least in part on the pigment and/or media being used. For example, an effective amount of PR168 in an embodiment of the red ink may range from about 5 wt % to about 7 wt %. It is also believed that higher pigment loads improve ink usage efficiency and chroma on media (e.g., plain paper) that may not tolerate high amounts of ink. Furthermore, if lighter shades of the respective inks are desirable (e.g., a light magenta ink), the effective amount of pigment may exceed the low end of the range. In a non-limiting example, a light magenta ink includes about 1.2 wt % pigment load, but may include as low as about 0.7 wt % pigment load. Generally, the ratio of effective amount of pigment in light inks to the effective amount of pigment in the dark inks ranges from about 1:5 to about 1:2.

In one embodiment of the ink set, the red ink includes PR149, and the magenta ink includes CROMOPHTAL® Jet Magenta 2BC. In another embodiment, the red ink includes PR149, and the magenta ink includes a homogeneous quinacridone solid solution pigment. In this embodiment, the magenta ink may be a light magenta ink or a dark magenta ink. It is to be understood that the ink set may include both a light and a dark magenta ink, each of which is formulated with CROMOPHTAL® Jet Magenta 2BC, or mixtures or solid solutions of a quinacridone pigment. In another embodiment including both a light and a dark magenta ink, the light magenta ink includes CROMOPHTAL® Jet Magenta 2BC, or mixtures or solid solutions of a quinacridone pigment, and the dark magenta ink includes PR122.

It is to be understood that embodiments of the ink set disclosed herein may also include additional inks. Non-limiting examples of such inks include cyan inks, yellow inks, orange inks, green inks, blue inks, violet inks, black inks, gray inks, colorless inks, and combinations thereof.

Suitable cyan inks have a hue angle h° value ranging from about 200 to about 260. Non-limiting examples of pigments suitable for such a cyan ink include pigment blue 15:3 and pigment blue 15:4. Suitable yellow inks have a hue angle h° value ranging from about 80 to about 120. Non-limiting examples of pigments suitable for such yellow inks include PY74, PY128 and PY155. In one embodiment, the yellow ink includes an effective amount of PY155. Suitable orange inks have a hue angle h° value ranging from about 10 to about 80. While PR 168 is suitable for use in the red ink, it may also be used as the pigment for the orange ink.

Suitable green inks have a hue angle h° value ranging from about 120 to about 200. Non-limiting examples of suitable pigments for the green inks include PG7 and PG36. In one embodiment, the green ink includes PG36. Suitable blue inks and violet inks have a hue angle h° value ranging from about 260 to about 320. A non-limiting example of a suitable pigment for the blue ink is pigment violet 23.

The black inks may be selected from matte black inks, which are particularly suitable for matte media, and photoblack inks, which are suitable on all media. In one embodiment, the ink set includes both a matte black ink and a photoblack ink. Such inks may include a combination of pigments, such as carbon black, cyan pigments, and violet pigments.

In one embodiment, the matte black ink has a relatively large particle size carbon black pigment in a dispersion (in part to achieve desirable optical density and surface retention on matte media). As non-limiting examples, the matte black includes an average carbon black particle size ranging from about 20 nm to about 200 nm, or from about 70 nm to about 200 nm. It is believed that matte black ink will reach an OD of at least 1.4 on fine art media and a maximum OD greater than 1.2 on plain paper. In an embodiment, the matte black inks have a pigment load of greater than 3.5%.

The photoblack ink has a relatively small pigment particle size (in part to achieve desirably high gloss). As non-limiting examples, the photoblack includes an average carbon black particle size ranging from about 20 nm to about 200 nm, or from about 20 nm to about 130 nm. It is believed that photoblack ink typically has a maximum OD of more than 2.0, and has good smudge resistance on glossy media. In an embodiment, the photoblack inks have a pigment loading of less than 3.5%, and a low pigment surface area to volume ratio as compared to matte black inks.

Light and medium gray inks may also be included in an embodiment of the ink set. In one embodiment, the gray ink has a lightness L* value that is greater than the lightness values of one or both of the matte black ink and the photoblack ink. In another embodiment, the gray ink has a lightness L* value that is less than the lightness values of one or both of the matte black ink and the photoblack ink. In a non-limiting example, the matte black ink has a lightness L* value less than 20, and the photoblack ink has a lightness L* value less than 8.

As previously stated, the ink set may also include a colorless ink. In an embodiment, the colorless ink is a gloss enhancer including soluble binders, such as water soluble polymers, or dispersed latex in an ink vehicle. Generally, the gloss enhancer provides the printed substrate with a smooth, glossy and clear surface. The gloss enhancer may be substantially free of colorants visible to the unaided eye (i.e., from 0 to less than approximately 0.01% colorant is present). In some embodiments, dyes and pigments free of visible colorants may be included in gloss enhancer, such as, for example, IR colorants, UV colorants and mixtures thereof. A non-limiting example of such a gloss enhancer includes up to about 15% of the polymer or dispersed latex, up to about 50% of one or more co-solvents, and up to about 4% of one or more water soluble surfactants. The gloss enhancer may be used to fill in the spaces where there is an absence of color to promote a uniform glossy surface, and impart stain resistance to images.

It is to be understood that any of the colored inks described herein above may be incorporated with light, medium or dark shades, as is desirable. As such, multiple inks of the same color may be included, where each of the inks has a different pigment loading. It is to be further understood that the pigment used in different shades may be the same or different. Furthermore, one or more dilutions of any of the colored inks may be included.

A non-limiting example of the ink set disclosed herein includes a light magenta ink (e.g., including CROMOPHTAL® Jet Magenta 2BC), a dark magenta ink (e.g., including CROMOPHTAL® Jet Magenta 2BC or PR122), a red ink (including PR149), a yellow ink (e.g., including PY155), a cyan ink and/or a light cyan ink (e.g., including PB15:3), a blue ink (e.g., including PV23), a green ink (e.g., including PG36), a photoblack ink, a matte black ink, a medium gray ink, a light gray ink, and a gloss enhancer.

In an embodiment of a method of using the embodiment(s) of the ink set disclosed herein, any of the inks (e.g., the red ink, the magenta ink, etc.) is established on at least a portion of the substrate to form an image (i.e., text, graphics, etc.). The amount of ink used depends, at least in part, on the desirable image to be formed.

A non-limiting example of a suitable printing technique includes inkjet printing, such as, for example, thermal inkjet printing, piezoelectric inkjet printing, and/or continuous inkjet printing. Suitable printers include portable inkjet printers (e.g., handheld printers, arm mountable printers, wrist mountable printers, etc.), desktop inkjet printers, large format inkjet printers, or combinations thereof. Generally, each of the inks in the ink set is loaded into a supply assembly that is capable of being operatively positioned in the printer.

In some embodiments, the ink set is provided as a pen configuration, such as, for example, single color pens, dual chamber pens, tri-chamber pens, brick heads, or other pen configurations. In one embodiment, the ink set is a series of tri-chamber inkjet pens or cartridges, where each of the pens includes separate chambers for each of the inks. Thus, in one embodiment, the ink set includes a first tri-chamber inkjet pen or cartridge including respective chambers for cyan ink, light magenta ink, and dark magenta ink, a second tri-chamber pen including respective chambers for red ink, green ink, and blue ink, a third tri-chamber pen including respective chambers for matte black ink, photoblack ink, and dark gray ink, and a fourth tri-chamber inkjet pen including respective chambers for yellow ink, light gray ink, and gloss enhancer.

In still another embodiment, the ink set includes individual or separate inkjet pens or cartridges for each of the inks. The ink set may also be provided in a brick head, where all colors are in respective chambers and on the same head. In a further embodiment, the ink set may be provided in dual chamber pens or cartridges. As a non-limiting example, the ink set is a dual chamber inkjet pen including a chamber for the magenta ink and a chamber for the red ink. Additional dual chamber pens may be included to store any other desirable colors.

The inks disclosed herein include the previously described pigment(s) and an ink vehicle. As used herein, the term "ink vehicle" refers to the combination of water and solvents (and additives, if desired) to form a vehicle in which the colorant is placed to form an embodiment of the ink composition. It is to be understood that a variety of components in varying amounts may be used as the ink vehicle. Such ink vehicles may include a mixture of different components including, for example, solvents (e.g., aliphatic alcohols, aromatic alcohols, diols, glycol ethers, polyglycol ethers, caprolactams, formamides, acetamides, long chain alcohols, and/or combinations thereof), buffers, biocides, fungicides, and other microbial agents, viscosity modifiers, surface-active agents (surfactants such as, for example, alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and/or combinations thereof), salts, sequestering agents (e.g., EDTA), metal chelators, and water.

To further illustrate the embodiment(s) of the present disclosure, an example is given herein. It is to be understood that this example is provided for illustrative purposes and is not to be construed as limiting the scope of the disclosed embodiment(s).

EXAMPLE

Red, magenta and light magenta inks were formulated according to embodiments disclosed herein. The red ink included about 3.5 wt % of PR149, and the magenta and light magenta inks included, respectively, about 4.0 wt % and about 1.25 wt % of CROMOPHTAL® Jet Magenta 2BC. Comparative red, comparative magenta and comparative light magenta inks formulated with pigment red 168 and pigment red 122 were also prepared. The ink vehicle for each of the inks was the same. The ink vehicle included a dispersant, JONCRYL® 683 (BASF Corp., Mount Olive, N.J.), biocide(s), diethylene glycol, ethoxylated glycerol, 2-pyrrolidone, glycerol, 1,2-hexanediol, ethoxylated acetylenic diol, fluorosurfactant, triethanolamine (TEA), other surfactants, buffer(s), and water.

The inks were tested for red gamut, metamerism, gloss, cap storage, light fastness, and ozone fastness.

In order to evaluate image permanence of the inks, prints were generated on HP Advanced Photo Paper using an HP DESKJET® 6540 printer equipped with HP 94 Color printheads. The prints contained patches of the red and magenta inks disclosed herein, printed side-by-side with the comparative red and magenta inks.

Lightfastness was evaluated by exposing the prints to a fluorescent cool white light at an intensity of about 70 kLux and a relative humidity of about 50%. The green-filter optical density loss was tracked over time. The exposure was conducted in an internally-designed fadeometer similar to an Atlas HPUV Fadeometer. Ozonefastness testing was conducted in a 903b ozone chamber (Hampden Test Equipment Ltd) at 50% relative humidity, 30° C. and 1.0 ppm level of ozone. The relative rankings in lightfastness and ozonefastness were based on the total exposure needed to attain a 25% green-filter optical density loss.

Metamerism was evaluated by measuring the Delta E in LAB coordinates of magenta and red patches under different light conditions (D50 versus F11 versus A) using a Gretag-Macbeth Spectrolino.

Capped storage was evaluated by filling the printheads of an HP PHOTOSMART® B9180 printer with the inks and the comparative inks, storing the inks in the printer for a period ranging from 4 to 6 weeks, and then measuring the amount of ink that was primed out of the printheads in order to have sufficient nozzle recovery.

Gloss was measured at 20 degrees using a BYK Micro-Glossmeter.

Table 1 illustrates both the formulation and the results for each of the inks.

TABLE 1

|  | Comparative Red | Red | Comparative Magenta | Magenta | Comparative Light Magenta | Light Magenta |
| --- | --- | --- | --- | --- | --- | --- |
| Ink Vehicle | Same | Same | Same | Same | Same | Same |
| PR168 | 4.7% | None | None | None | None | None |
| PR149 | None | 3.5 wt % | None | None | None | None |
| PR122 | None | None | 3.8 wt % | None | 1.25 wt % | None |
| CROMOPHTAL ® Jet Magenta 2BC | None | None | None | 4.0 wt % | None | 1.25 wt % |
| Water | Balance | Balance | Balance | Balance | Balance | Balance |
| Total | 100% | 100% | 100% | 100% | 100% | 100% |

TABLE 1-continued

|  | Comparative Red | Red | Comparative Magenta | Magenta | Comparative Light Magenta | Light Magenta |
|---|---|---|---|---|---|---|
| Red Gamut | − | + | − | + | − | + |
| Metamerism | = | = | − | + | − | + |
| Gloss | − | + | = | + | = | = |
| Cap Storage | − | + | = | = | = | = |
| Light Fastness | +/= | −/= | = | = | = | = |
| Ozone Fastness | = | = | = | = | = | = |

The red ink performed better (denoted by the + sign) or equal (denoted by the = sign) to the comparative red ink in all categories except lightfastness. While the lightfastness of both red inks were good, the comparative red ink (formulated with PF168) had slightly better lightfastness.

Both the magenta and light magenta inks exhibited better red gamut and metamerism than the respective comparative inks. The magenta and light magenta inks exhibited relatively equal performance to the respective comparative inks in all other categories.

Without being bound to any theory, it is believed that the ink set disclosed herein advantageously provides enhanced red chroma, enhanced red color saturation, reduced metamerism in skin tone and neutral ramp, enhanced pigment stability and pen reliability, enhanced color gamut, enhanced light and ozone fastness, and/or combination thereof.

While several embodiments have been described in detail, it will be apparent to those skilled in the art that the disclosed embodiments may be modified. Therefore, the foregoing description is to be considered exemplary rather than limiting.

What is claimed is:

1. An ink set, comprising:
   a red ink including an effective amount of a red pigment having a predetermined red/green lambda cutoff;
   a magenta ink including a water-based vehicle and an effective amount of a magenta pigment i) having a predetermined red/green lambda cutoff that is substantially similar to the predetermined lambda cutoff of the red pigment and ii) reflecting at least about 14% of blue light at a wavelength of about 470 nm when measured at a density at which the magenta ink provides a maximum magenta chroma;
   a yellow ink including an effective amount of pigment yellow 155;
   a green ink including an effective amount of pigment green 36;
   a cyan ink including an effective amount of pigment blue 15:3;
   a blue ink including an effective amount of pigment violet 23;
   a matte black ink;
   a photoblack ink;
   a medium gray ink;
   a light gray ink;
   a dark magenta ink including a mixture of quinacridone pigments; and
   a gloss enhancer;
   wherein the red pigment is pigment red 149, wherein the magenta pigment is the mixture of quinacridone pigments, and wherein the magenta ink is a light magenta ink.

2. The ink set as defined in claim 1 wherein the predetermined red/green lambda cutoff for each of the red pigment and the magenta pigment ranges from about 585 nm to about 600 nm.

3. The ink set as defined in claim 1 wherein the red ink provides the ink set with at least one characteristic selected from enhanced red chroma, enhanced red saturation, enhanced efficiency, enhanced pigment stability, enhanced lightfastness, enhanced ozonefastness, and combinations thereof.

4. The ink set as defined in claim 1 wherein the magenta ink provides the ink set with an enhanced color gamut volume in an orange red region, an enhanced color gamut volume in a blue region, reduced metamerism, enhanced lightfastness, enhanced ozonefastness, or combinations thereof.

5. The ink set as defined in claim 1 wherein the ink set includes an other red ink including an effective amount of pigment red 168.

6. An ink set, comprising:
   a red ink including an effective amount of a red pigment having a predetermined red/green lambda cutoff;
   a magenta ink including an effective amount of a magenta pigment having a predetermined red/green lambda cutoff that is substantially similar to the predetermined lambda cutoff of the red pigment;
   a cyan ink having a hue angle h° value ranging from about 200 to about 260;
   a yellow ink having a hue angle h° value ranging from about 80 to about 120;
   an orange ink having a hue angle h° value ranging from about 10 to about 80;
   a green ink having a hue angle h° value ranging from about 120 to about 200;
   a blue ink having a hue angle h° value ranging from about 260 to about 320;
   a violet ink having a hue angle h° value ranging from about 260 to about 320;
   a black ink selected from i) at least one matte black ink having an average carbon black particle size ranging from about 70 nm to about 200 nm and a first lightness L* value and ii) at least one photoblack ink having an average carbon black particle size ranging from about 20 nm to about 130 nm and a second lightness L* value; and
   a gray ink having a third lightness L* value greater than that of the first lightness L* value and second lightness L* value.

7. The ink set as defined in claim 6 wherein the magenta ink includes a water-based vehicle, and wherein the magenta pigment reflects at least about 14% of blue light at a wavelength of about 470 nm when measured at a density at which the magenta ink provides a maximum magenta chroma.

8. An ink system, comprising:
   a first ink supply assembly containing a red ink including an effective amount of a red pigment having a predetermined red/green lambda cutoff;

a second ink supply assembly containing a magenta ink including a water-based vehicle and an effective amount of a magenta pigment i) having a predetermined red/green lambda cutoff that is substantially similar to the predetermined red/green lambda cutoff of the red pigment; and ii) reflecting at least about 14% of blue light at a wavelength of about 470 nm when measured at a density at which the magenta ink provides a maximum magenta chroma;

a cyan ink having a hue angle h° value ranging from about 200 to about 260;

a yellow ink having a hue angle h° value ranging from about 80 to about 120;

a green ink having a hue angle h° value ranging from about 120 to about 200;

a blue ink having a hue angle h° value ranging from about 260 to about 320;

at least one matte black ink having an average carbon black particle size ranging from about 70 nm to about 200 nm;

at least one photoblack ink having an average carbon black particle size ranging from about 20 nm to about 130 nm;

a medium gray ink;

a light gray ink;

a dark magenta ink including pigment red 122, or a mixture of a quinacridone pigment, or a solid solution of a quinacridone pigment; and a gloss enhancer;

wherein the red pigment is pigment red 149, and wherein the magenta ink is a light magenta ink including the mixture of the quinacridone pigment or the solid solution of the quinacridone pigment.

9. The ink system as defined in claim 8 wherein the mixture of the quinacridone pigment or the solid solution of the quinacridone pigment includes a mixture of different derivatives of formula (A), or a solid solution of formula (A):

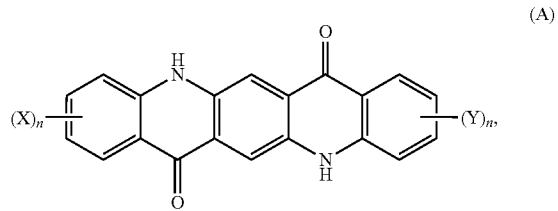

wherein X and Y are each independently selected from a halogen, —OH, —NO$_2$, —CF$_3$, a C$_1$-C$_4$ alkyl group, a substituted C$_1$-C$_4$ alkyl group, branched alkyl groups, unbranched alkyl groups, a C$_1$-C$_4$ alkoxy group, a substituted C$_1$-C$_4$ alkoxy group, a phenyl group, a cyclohexyl group, a phenoxy group, —COOH, a —COO—C$_1$-C$_4$ alkyl group, —SO$_3$H, a phenylamino group, a benzamino group, —N(CH$_3$)$_2$, —SO$_2$NH$_2$, —SO$_2$N(CH$_3$)$_2$, a pyridino group, —CONH$_2$ or —CON(CH$_3$)$_2$, and wherein n is 0, 1, or 2.

10. The ink system as defined in claim 8 wherein:

the yellow ink includes an effective amount of pigment yellow 155;

the green ink includes an effective amount of pigment green 36;

the cyan ink includes an effective amount of pigment blue 15:3; and the blue ink includes an effective amount of pigment violet 23.

* * * * *